(12) United States Patent
Martinetz et al.

(10) Patent No.: US 9,159,134 B2
(45) Date of Patent: Oct. 13, 2015

(54) METHOD AND APPARATUS FOR ESTIMATING A POSE

(75) Inventors: Thomas Martinetz, Lübeck (DE); Kristian Ehlers, Lübeck (DE); Fabian Timm, Lübeck (DE); Erhardt Barth, Ovendorf (DE); Sascha Klement, Lübeck (DE)

(73) Assignee: Universitat Zu Lubek, Lubeck (DE)

( * ) Notice: Subject to any disclaimer, the term of this patent is extended or adjusted under 35 U.S.C. 154(b) by 0 days.

(21) Appl. No.: 14/365,222

(22) PCT Filed: Dec. 16, 2011

(86) PCT No.: PCT/EP2011/006388
§ 371 (c)(1),
(2), (4) Date: Jun. 20, 2014

(87) PCT Pub. No.: WO2013/087084
PCT Pub. Date: Jun. 20, 2013

(65) Prior Publication Data
US 2014/0328519 A1 Nov. 6, 2014

(51) Int. Cl.
*G06K 9/00* (2006.01)
*G06T 7/00* (2006.01)
*G06T 7/20* (2006.01)

(52) U.S. Cl.
CPC ............ *G06T 7/0046* (2013.01); *G06T 7/2046* (2013.01); *G06T 2207/10028* (2013.01); *G06T 2207/20044* (2013.01); *G06T 2207/20081* (2013.01); *G06T 2207/30196* (2013.01)

(58) Field of Classification Search
None
See application file for complete search history.

(56) References Cited

U.S. PATENT DOCUMENTS 5,715,166 A 2/1998 Besl
6,440,067 B1 * 8/2002 DeLuca et al. ............... 600/300
(Continued)

FOREIGN PATENT DOCUMENTS

WO WO 2010/130245 11/2010
WO WO2010130245 * 11/2010

OTHER PUBLICATIONS

Stolkin, "Continuous Machine Learning in Computer Vision—Tracking with Adaptive Class Models" pp. 265-282, Scene Reconstruction, Pose Estimation and Tracking, Book edited by: Rustam Stolkin, ISBN 978-3-902613-06-6, pp. 530, I-Tech, Vienna, Austria, Jun. 2007.*

(Continued)

*Primary Examiner* — Tahmina Ansari
(74) *Attorney, Agent, or Firm* — Wood, Phillips, Katz, Clark & Mortimer

(57) ABSTRACT

The invention relates to a real time-capable analysis of a sequence of electronic images for estimating the pose of a movable object captured by means of the images. The invention further relates to implementing the invention in software and, in this connection, to a computer-readable medium that stores commands, the execution of which causes the method according to the invention to be carried out. The invention proceeds from a skeleton model, which is described by a small number of nodes in 3D space and permits a good data compression of the image information when the co-ordinates of the nodes describe at any time the position of predetermined parts of the moving object. The skeleton model simultaneously represents previous knowledge of the object, by defining e.g. node pairs and optionally also node triplets in the skeleton model that describe cohesive object parts or optionally object surfaces, which are contained in the measured 2½-D image information, i.e. are visible to the camera. The skeleton model is to be fitted quickly and accurately into the image information. The fitting is effected between two images of an image sequence by the continuous displacement of the nodes and the continuous updating of the skeleton model.

8 Claims, 4 Drawing Sheets

(56) References Cited

U.S. PATENT DOCUMENTS

| | | | |
|---|---|---|---|
| 8,351,646 B2* | 1/2013 | Fujimura et al. | 382/103 |
| 8,374,388 B2* | 2/2013 | Stolkin et al. | 382/103 |
| 8,620,050 B2* | 12/2013 | Liao et al. | 382/130 |
| 2006/0282236 A1* | 12/2006 | Wistmuller | 703/2 |
| 2009/0244309 A1* | 10/2009 | Maison et al. | 348/222.1 |
| 2010/0183229 A1* | 7/2010 | Ruzon et al. | 382/197 |
| 2014/0105457 A1* | 4/2014 | Metzler et al. | 382/103 |
| 2014/0301627 A1* | 10/2014 | Dean et al. | 382/141 |
| 2014/0328519 A1* | 11/2014 | Martinetz et al. | 382/107 |

OTHER PUBLICATIONS

Turk, Greg, and Marc Levoy. "Zippered polygon meshes from range images." Proceedings of the 21st annual conference on Computer graphics and interactive techniques. ACM, 1994.*

PCT International Search Authority Written Search Opinion for PCT/EP2011/006388, parent of instant U.S. Appl. No. 14/365,222, Made available online on Jun. 16, 2014, Available on the WIPO website at: https://patentscope.wipo.int/search/docservicepdf_pct/id00000025280846/ETWOS/WO2013087084.pdf.*

Haker, Martin, Martin Böhme, Thomas Martinetz, and Erhardt Barth. "Self-organizing maps for pose estimation with a time-of-flight camera." In Dynamic 3D Imaging, pp. 142-153. Springer Berlin Heidelberg, 2009.*

Simon D.A. et al: "Real-time 3-D pose estimation using a high-speed range sensor"—Robotics and Automation, 1994 IEEE Int'l Conference, May 8, 1994 (pp. 2235-2241).

Turk G. et al.: "Zippered polygon meshes from range images"—1994 Computer Graphics Proceedings (pp. 311-318).

* cited by examiner a) b) c)

a)

b)

c)

a)

b)

METHOD AND APPARATUS FOR ESTIMATING A POSE

FIELD OF THE INVENTION

The invention relates to a method and an apparatus for real time-capable analysis of a sequence of electronic images for estimating the positions and orientations of a movable object captured in the image sequence, i.e. estimating the pose of the movable object. The invention further also relates to implementing the invention in software and in this context to a computer-readable medium that stores commands the execution of which causes the method according to the invention to be carried out.

TECHNICAL BACKGROUND

Estimating human poses by a computer is the basis of a gesture-controlled human-machine interaction. Body or hand gestures are captured by cameras, the captured digital images are processed in the computer and interpreted as commands that are eventually carried out by the computer or by equipment controlled by it. The human user no longer requires separate input equipment if he masters the commanding gestures.

Among particularly interesting areas of application of gesture control are on the one hand the field of medical surgery where the operating physician would like to have direct control of auxiliary equipment (e.g. imaging devices such as ultrasound or MRT), but cannot touch any control devices with his hands in order to safeguard sterility, and on the other hand the field of public information terminals or ticket machines that at present are still equipped with the rather unhygienic touch pads. A further field of application that has already been opened up commercially is the computer game sector.

The purpose of a gesture-control method is to give the optical image of a person a machine-interpretable meaning. This requires an apparatus that images the person such that it can be evaluated electronically, compresses this image in terms of its information content and finally translates the compressed image of the person into a machine-interpretable output. The output of the apparatus can consist of control commands for downstream apparatuses to be controlled. However, it is also possible that it comprises only the compressed image information that is fed to a downstream unit for interpreting this information.

An example for compressed image information is for example the continuous output of the position coordinates of the right hand of the person in a 3D coordinate system. In the process it is often sufficient to output only coordinates of a single point for the hand position, e.g. if the entire body of the person is imaged. If the motion of the person is imaged by an image sequence, the apparatus mentioned for example provides the 3D coordinates of predetermined body parts that change over time—during the motion. The coordinates can serve as variable inputs into a program that e.g. accordingly controls a cursor position on a screen.

During image segmentation, all recorded image data (measurement values) that cannot be assigned to the imaged person are removed, that is in particular image elements that concern the background. Such image elements have to be excluded from further evaluation.

Image segmentation using two-dimensional data is difficult above all if the user is imaged in front of a complex background—for example further persons move in the background—or if he makes gestures where he moves extremities towards the camera such that they conceal part of his torso. Since gesture control is to take place in real time and pose estimation usually is to be possible at a video frame rate of 25 Hz or above, it is necessary that image segmentation can take place within a few milliseconds. For this purpose, depth sensor cameras can be used that cannot only measure, as conventional cameras, a brightness image, but also the distance of the camera from the object.

A known depth sensor camera is called time-of-flight camera (TOF). It emits infrared light whose intensity is modulated sinusoidally. The phase displacement between the emitted light and the light reflected by the object is measured in each pixel. From this phase displacement, the propagation time ("time of flight") of the light and thus the distance of the camera from the object point can be calculated. A TOF camera provides a depth map that is in registry with a brightness image (in TOF nomenclature often called amplitude image).

A further method for simultaneously obtaining image and distance measurement values is based on structured light that is irradiated onto the object to be measured and reflected by it. A camera detects the reflected light—usually at a different angle than the angle of arrival—and registers the change of the structure of a projected pattern due to the position or extent of the reflected object surface. For example it is possible to calculate from the curvature of a reflected line captured by the camera that was originally projected onto the object as a straight line, a doming of the reflected surface, that is a distance variable relative to the projector and/or camera. In a similar way, a spatially divergent beam bundle is suitable that projects points in a three-dimensional scene, by detecting the point reflections and determining the distances between these. On a face located closer to the projector, the point distances are less than on a face in the image background. This is used for measuring the distances of faces or face areas from the projector.

According to this, a depth sensor camera is an apparatus that also provides distance information for each imaged object point in addition to a two-dimensional brightness image, so that in addition the position of all imaged object points along a depth axis—that usually coincides with the optical axis of the camera—is measured. The electronic image having distance information recorded using a depth sensor camera is also termed a two and a half dimensional image (2½ D) of the scene. The apparatuses mentioned above are only examples how 2½ D images can be produced and do not necessarily represent a final list.

Among others, it can be gathered from the printed publication WO 2010/130245 A1 how image segmentation of 2½ D images can take place correctly. Image segmentation orders the brightness values detected by the camera pixels according to the distance values measured simultaneously and registered by the pixels. Only brightness values of the foreground remain in the further evaluation, it being assumed that for the purpose of improved visibility, the person to be observed is closest to the camera. The brightness values of the foreground thus result from imaging the body surface of the person. By means of the camera projection parameters known per se, the imaged object points can then each be assigned a set of 3D coordinates. A list of 3D coordinates is then obtained that comprises all the points of the person that are directly visible for the camera. Inside this "cloud" of points in the 3D space there is the actual person, and inside the 3D point cloud there are also the relevant coordinates of the predetermined body parts that are desired to be determined for the purpose of gesture control.

The second part step of information compression can thus be seen in determining from the 3D point cloud, determined by image segmentation and representing the person, a reduced set of point coordinates that describes as best as possible an entire pose of the person and is suitable for machine interpretation. This step is also called pose estimation. One aim of pose estimation is here the robustness of the reduced data set, i.e. small changes of the human pose shall also lead only to small changes in the data sets describing the pose. In particular the coordinates describing the human body parts shall, as far as possible, move on temporally continuous trajectories so that an unambiguous correlation of the coordinates with these body parts is given at any time.

A known and generally accepted approach is the definition of a skeleton model of the person that is to be fitted as fast as possible into the 3D point cloud.

WO 2010/130245 A1 discloses a method for real time-capable pose estimation from sequences of 2½ D images, where a skeleton model is proposed that is explained as a topology of nodes and edges. The edges that can be described as pairs of nodes code a neighborhood structure between the nodes. The nodes are fitted into the previously determined point cloud by applying a learning rule for training a self-organizing map ("SOM").

In the exemplary embodiment of WO 2010/130245 A1, the upper part of the human body is modelled using a topology from 44 nodes and 61 edges. The 3D point cloud representing the person comprises approximately 6500 data points (depicted in the real 3D space in which the person observed exhibits a defined size independently from his distance from the camera), of which approximately 10% are used for training an SOM. All nodes of the topology can be directly regarded as an SOM, while specifying the edges can be regarded as a special requirement or limitation for the learning rule.

The topology is trained separately for each frame of a video sequence, the training result of a frame at the same time serving to initialize the training of the following frame of the sequence. During initialization of the first frame of a sequence the size of the topology is preferably matched to the size of the person in front of the camera by a one-off scaling, and its centre of gravity is displaced into the centre of gravity of the 3D point cloud. If the size of the topology has once been selected correctly, it does not require further adapting during the on-going method, since the method functions scale-invariantly. Training the frames takes place by applying a pattern-by-pattern learning rule having the following steps:
a. randomly selecting a data point X of the 3D point cloud;
b. determining that node of the topology that exhibits the minimum distance from X;
c. determining all neighbouring nodes of the node determined under b. according to the edge specification of the topology;
d. displacing the nodes determined under b. and c. in the direction of X (see in this respect the equations (2) and (3) of WO 2010/130245 A1),
e. the displacement vectors being multiplied by learning rates that exhibit precisely half the size for the nodes determined under c. as for the nodes determined under b. (see in this respect WO 2010/130245 A1, p. 13, paragraph 4);
f. repeating the steps a. to e. for a predetermined number of learning steps while gradually reducing the learning rates.

It is convenient to specify a maximum number of learning steps for each frame for carrying out the pose estimation—i.e. in this case fitting the skeleton model into the 3D point cloud and reading out all relevant nodes positions—during a predetermined time interval. In this way, image sequences can also be analysed at the video frame rate or even faster.

Although the algorithm of WO 2010/130245 A1 fulfils well the object of real-time pose estimation, it still does exhibit a few weaknesses that are partly mentioned in the printed publication itself. In particular when analysing scenes where the person brings his arms together or crossed them in front of the body, the learning rule can lead to misinterpretations—that can be corrected during the course of further iterations—if individual nodes are pulled away far from their actual neighbours in the topology. This effect is countered in WO 2010/130245 A1 with an anchoring point in the model torso and a secondary condition of the learning rule that inhibits nodes displacements away from the anchoring point beyond a predetermined threshold.

The teaching of WO 2010/130245 A1 further also shows difficulties with the precise position determination of human joints, shoulders, and hips, that can in each case be represented by several different nodes. The skeleton model outlined in WO 2010/130245 A1 exhibits relatively many nodes, whose number cannot be readily reduced to 20 or less without accepting considerable errors in the pose estimation. Systems that are available on the market for gesture control by means of depth sensor cameras already operate using skeleton models having 15-20 nodes rather designed according to the human anatomy. By reducing the node count, a higher processing speed of the camera images can also be obtained.

Anatomically motivated skeleton models are additionally suited for falling back on stored movement patterns (templates) for detecting fast and complex movements (e.g. swinging a golf club). In these cases, the gesture-control software looks for the most likely match of the detected pose change to a previously stored movement sequence and uses this known template for the actual control. This technology is already used in computer games, but it is resource intensive. Last but not least, producing the stored movement data already gives rise to considerable costs.

Gesture control by means of SOM training on the other hand completely dispenses with templates and is rather solely based on the real time-capable detectability of the movement continuity. Due to learning rules that can be implemented efficiently, it has the potential to reliably detect even fast human movements and at the same time maintains the universal applicability so that possibly complex matching of the software to the measurement task is omitted.

Abstract of the Invention

It is therefore the object of the invention to compress digital image information of the camera image of an object, in particular for pose estimation, so that determination of the pose of the object, in particular a human pose, can be carried out in real time with less computational effort and thus faster and/or more precisely.

The object is achieved by the subject matter of the independent patent claims. Advantageous embodiments of the invention are the subject matter of the dependent patent claims.

An aspect of the invention is thus information compression that usually takes place in two part steps: image segmentation and pose estimation. In this context, the invention in particular relates to improving pose estimation. According to the invention, pose estimation by means of SOM training is proposed that is able to work with a skeleton model that is modelled according to the anatomy of the object observed and exhibits a reduced node count, it being possible to reliably and consistently assign each model node to a predetermined body part. Here the anatomy of the object whose pose is to be detected is modelled as a skeleton model.

A skeleton model that is described only by a small number of points ("nodes" below) in the 3D space represents a good information compression of the image information if the coordinates of the nodes at all times describe the position of predetermined parts of the moving object. At the same time, the skeleton model represents prior knowledge on the object, in that e.g. node pairs and optionally also node triplets are defined in the skeleton model that describe contiguous objects parts or optionally object faces that are contained in the measured 2½ D image information, i.e. are visible for the camera. The skeleton model is to be fitted fast and precisely into the image information that corresponds to the object. The fitting is effected between two images of an image sequence by continuously displacing the nodes and updating the skeleton model in step with the image sequence. In the case of the contiguous object parts or possible object faces already mentioned, it is assumed that they move as a whole. According to the invention a node pair or optionally a node triplet is thus displaced simultaneously under specific preconditions. It has to be emphasized here that the displacement rules described further below not necessarily preserve the distances of the nodes of a node pair or optionally node triplet, but that the displacement can also lead to an increase in the distances of the nodes of a node pair or optionally a node triplet.

An embodiment of the invention refers to a method for pose estimation of a moving object (e.g. a person or a robot) by computer calculation of displacements of 3D position coordinates of the nodes of a skeleton model, that is continuously fitted into a sequence of 3D point clouds. The node coordinates are present in table form in an electronic memory and the 3D point clouds are determined from electronically recorded images from a depth sensor camera that represent the moving person. The skeleton model is a topology that exhibits as topology elements $N_1$ nodes, $N_2$ edges, and $N_3$ triangles having $N_1$, $N_2>0$ and $N_3 \geq 0$, and each topology element being described by nodes, node pairs, or node triplets and being firmly assigned to a part of the object (e.g. a human body part or part of a robot). The method is carried out by an arithmetic unit and comprises the following steps:

a. randomly selecting a data point X of the 3D point cloud;
b. calculating the crossing point P relative to X with reference to each topology element and identifying whether P lies in each case inside the topology element;
c. calculating the distance from X to each topology element as the norm of the differential vector X-P;
d. determining that topology element that exhibits the minimum distance from X among all topology elements whose crossing point P lies inside the topology element;
e. displacing the topology element determined in step d by displacing all nodes establishing the topology element in the direction of the vector X-P, the displacement vector for a node being multiplied by a learning rate and by a weight that results from the crossing point P relative to X with reference to the topology element determined in step d, and repeating the steps a. to e. for a predetermined number of learning steps while gradually reducing the learning rate;
g. updating the node coordinates in the table of the electronic memory after K passes of the predetermined number of learning steps with K≥1;
h. providing at least the node coordinates updated in the table for further processing.

In a further embodiment of the invention in step b the crossing point P with reference to a topology element is represented as a linear combination of the node coordinate vectors establishing the topology element, and it is determined from the representation coefficients whether P lies inside the topology element.

In a further embodiment of the invention in step e the weight is calculated from the representation coefficients of P.

In a further embodiment of the invention the number of repetitions of the steps a to e is between 1,000 and 5,000, in particular between 2,000 and 3,000.

Advantageously the learning rate can lie between the starting value 0.5 and the end value 0.01.

A further embodiment of the invention proposes an apparatus for pose estimation of a moving object. This apparatus comprises a depth sensor camera, an electronic memory, and a programmable arithmetic unit, the memory storing the electronic images of the depth sensor camera and the arithmetic unit being designed to determine from the electronic images 3D point clouds representing the object, temporally in step with the image recording by the camera. The memory further stores a list of 3D coordinates for the nodes of a skeleton model. The arithmetic unit is able to read out and change these coordinates for individual nodes, predetermined node pairs, and predetermined node triplets as representation of the topology elements of the skeleton model. The arithmetic unit is further designed, after determining the 3D point cloud representing the object, to carry out the following steps:

a. randomly selecting a data point X of the 3D point cloud;
b. calculating the crossing point P relative to X with the reference to each topology element and determining whether P lies in each case inside the topology element;
c. calculating the distance from X to each topology element as the norm of the differential vector X-P;
d. determining that topology element that exhibits the minimum distance from X from all topology elements where the crossing point P lies within the topology element;
e. displacing the topology element determined in step d by displacing all nodes establishing the topology element in the direction of the vector X−P, the displacement vector for a node being multiplied by a learning rate and by a weight that results from the crossing point P relative to X with reference to the topology element determined in step d, and
f. repeating the steps a. to e. for a predetermined number of learning steps while gradually reducing the learning rate;
g. updating the node coordinates in the table of the electronic memory after K passes of the predetermined number of learning steps with K≥1;
h. providing at least the node coordinates updated in the table for further processing.

A further embodiment of the invention further relates to a computer-readable storage medium that is characterized in that it stores commands that can be executed by a microprocessor that cause the latter to carry out the method for pose estimation according to one of the described embodiments of the invention.

DESCRIPTION OF THE FIGURES

The invention is described below in more detail using exemplary embodiments with reference to the figures. Elements and details in the figures that correspond to each other have been provided with the same reference characters. In the drawings

DETAILED DESCRIPTION OF THE INVENTION

A skeleton model having only a low node count serves to effectively compress the image information when the coordinates of the nodes at any time describe the position of predetermined parts of the moving object. The skeleton model is defined using prior knowledge about the object. For example there is prior knowledge on which contiguous object parts and optionally object faces are visible for the camera. Predetermined elements of the skeleton model, in particular node pairs or node triplets, can represent these object parts or object faces already mentioned and be fitted as a whole into object images. This fitting takes place between two images of an image sequence by constantly displacing the nodes and updating the skeleton model in step with the image sequence. The contiguous object parts or object faces basically move as a whole, and according to the invention a node pair or optionally a node triplet is therefore displaced simultaneously under certain preconditions. In the process, the displacement rules do not necessarily preserve the distances of the nodes of a node pair or optionally node triplet relative to each other. The displacement can rather also lead to an increase in the distances of the nodes of a node pair or optionally a node triplet. The inventive relinquishment of complying with preserving the distances simplifies and accelerates the requisite calculations of the displacement vectors and all the same leads to a good pose estimation. The accuracy of fitting the skeleton model into the object images increases with the number of iterations (learning steps).

The invention is described below substantially in the style of the disclosure of WO 2010/130245 A1. It has to be remarked as a matter of principle that the pose estimation described in WO 2010/130245 A1 can be regarded as the starting point and that at least one embodiment of the invention can be regarded as a further development of the method for pose estimation known from this publication.

In this context, it is assumed in the following description of the embodiments of the invention that recording 2½ D-images (individually or as a sequence) and extracting a 3D point cloud representing the person can be carried out as described in WO 2010/130245 A1. The invention in particular assumes that images and point clouds for estimating a moved pose can be provided at a frequency of over 25 Hz.

Figure 1:
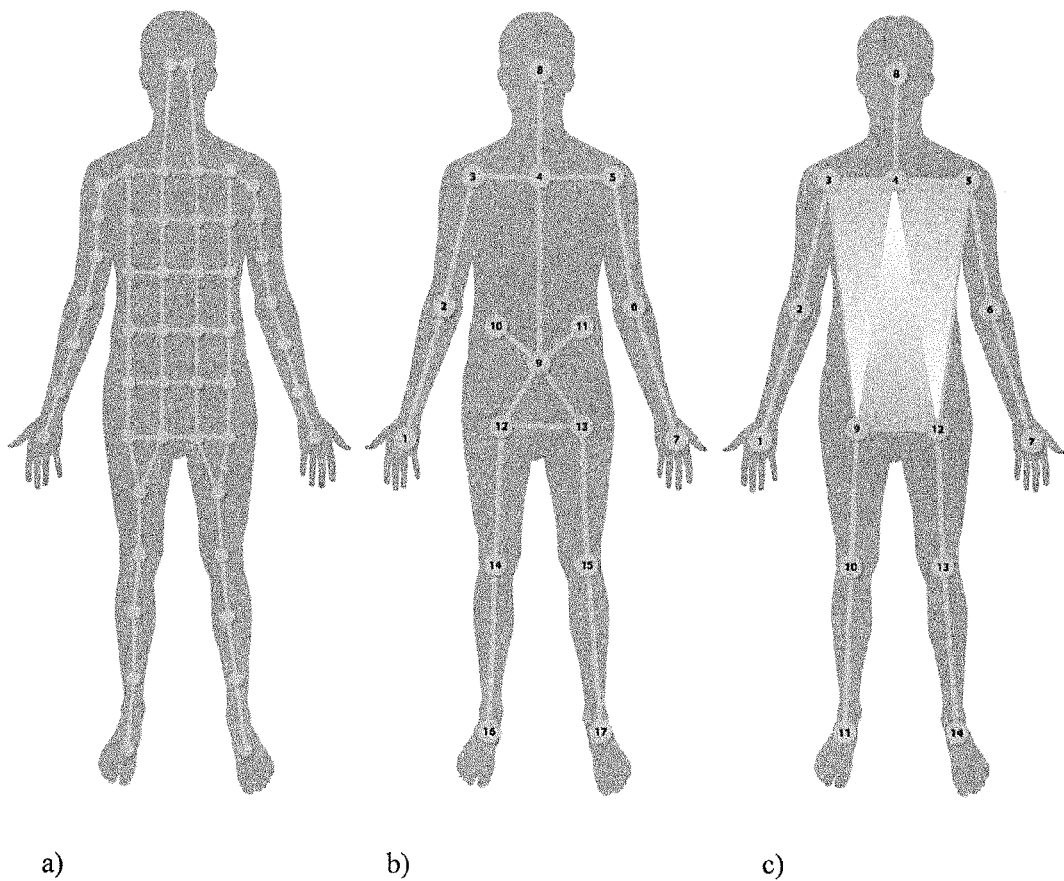
FIG. 1: shows sketches of usable skeleton models: a) according to WO 2010/130245 A1, b) model from nodes and edges, c) model from nodes, edges and triangles.

According to the invention, an anatomically motivated skeleton model is now used instead of the topology from WO 2010/130245 A1 that is seen as a comparison in FIG. 1 a). The model from FIG. 1 b) is particularly suited that unambiguously associates each node with a distinctive point of human anatomy (e.g. head, shoulder, elbow, hand, hip, pelvis, knee, foot). FIG. 1 c) represents a variant of the model from FIG. 1 b), where the torso is represented by triangles (in each case defined by three nodes that form the corners).

By identifying the nodes with human body parts, also the edges of the models are given an anatomic interpretation. Thus for example in FIG. 1 b) the edge that connects the nodes 1 (right hand) and 2 (right elbow) necessarily represents the right lower arm. Edges of the topology therefore represent more than just a neighborhood relation of the nodes. Applying the learning rule for the SOM from WO 2010/130245 A1 can no longer achieve good fitting of the model into the 3D point cloud for such a skeleton model that is markedly reduced in terms of its node count, so that a method for pose estimation is described below that is adapted to the inventive use of an anatomically motivated skeleton model.

Figure 2:
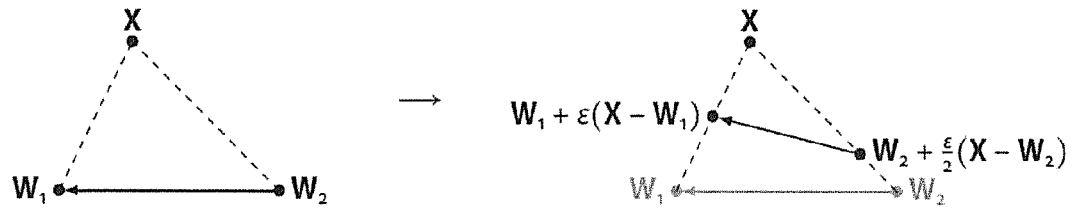
FIG. 2: shows a) an illustration of the learning rule from WO 2010/130245 A1, b) geometrical interpretation of the weights of the learning rule, and c) illustration of the effect of the learning rule for the case of an edge displacement.
Figure 2:
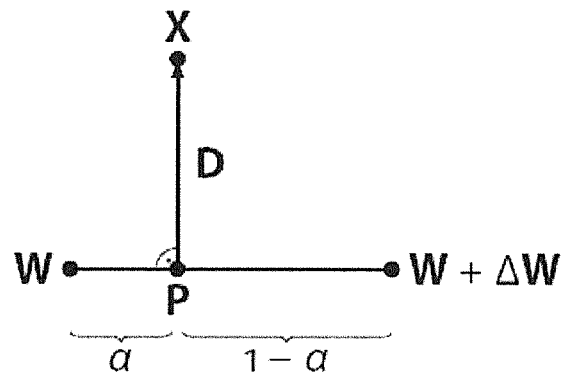
Figure 2:
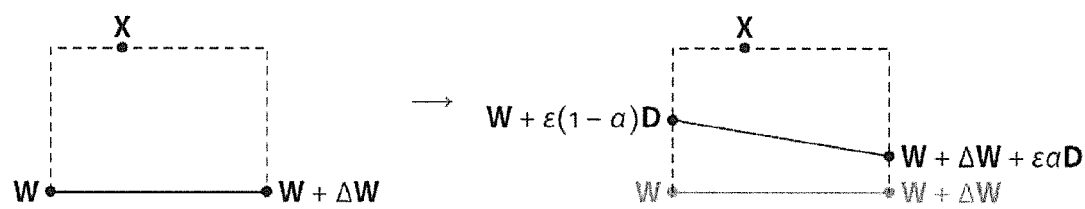

In FIG. 2 a), two nodes $W_1$ and $W_2$ can be seen on the left side that are connected by an edge. Point X designates a randomly selected point from the 3D point cloud into which the topology is to be fitted. According to the teachings of WO 2010/130245 A1, at first the node of the model (in this case: $W_1$) closest to the point X is determined and displaced in the direction towards X by $\epsilon(X-W_1)$. Here $\epsilon$ is a real positive number. The next neighbouring node in the sense of the topology is the node $W_2$ connected to $W_1$ by means of the edge. It, too, is displaced in the direction towards X by $$\frac{\varepsilon}{2}(X - W_2).$$

The displaced nodes are marked on the right side. This learning rule always shortens the edge between the nodes.

If the skeleton model comprises many nodes as in WO 2010/130245 A1, then the shortening processes are largely compensated again during the course of time as part of further iterations and node displacements. However, an unambiguous association of certain nodes with certain body parts is not always possible continuously.

For using the anatomic topologies of FIG. 1 b) or c), according to the invention new learning rules are therefore formulated that always permit the association of nodes, edges, and optionally triangles of the topology with body parts of the person.

An anatomic topology—or also: anatomic skeleton model—in the sense of the invention consists at least of a first number $N_1$ of nodes that are associated with human body points, and a second number $N_2$ of edges that are explained as a selection, satisfying anatomical facts, of pairs of the previously mentioned nodes.

To clarify: In FIG. 1 b), the model comprises the nodes $W_j$ with j=1, ..., 17 and further 17 edges that are represented by a selection of node pairs. For example the pairs $(W_1, W_2)$, $(W_2, W_3)$ or $(W_4, W_8)$ are part of the edges of the model, whereas for example pairs $(W_2, W_6)$ or $(W_{10}, W_{11})$ do not represent edges.

In an advantageous design of the invention, a third number $N_3$ of triangles can be part of the anatomical model. A triangle is described by a triplet of nodes, the nodes designating the edges of the triangle.

In FIG. 1 c), the model inter alia consists of the three triangles described by the node triplets $(W_3, W_4, W_9)$, $(W_9, W_4, W_{12})$ and $(W_4, W_5, W_{12})$.

Inserting triangles into the anatomical model is advantageous in particular for modelling objects (that for example correspond to body regions), that exhibit only little internal mobility and usually move in the image such that the relative position of the nodes forming the edges of the triangle is changed only little relative to each other. This for example applies to the torso of a person in an entire image, but can also for example in the case of close-ups of a hand concern the palm or the back of the hand. The user of the pose estimation method ultimately always has to decide for himself which object is to be observed or which topology seems suitable and/or particularly favourable for his specific purposes.

According to an embodiment, the present invention provides SOM learning rules for anatomical topologies from $N_1$ nodes, $N_2$ edges, and $N_3$ triangles for fitting into 3D point clouds, $N_1$, $N_2 > 0$ and $N_3 \geq 0$. Nodes, edges, and triangles are summarized below under the term topology elements.

The SOM is identified with the nodes of the topology. The learning rules are directed to displace the node positions such that the topology is fitted into a 3D point cloud. The specification of edges and optionally triangles on top of this means that some pairs and possible some triplets of nodes in each case have to obey inter-linked learning rules.

According to an embodiment of the invention, the learning rules are formed according to the following concept. Starting from the existence of an image sequence for which continuous pose estimation is to be carried out, the skeleton model that is a list of node positions (described in a 3D coordinate system), node pairs, and optionally node triplets, is in each case updated when a new image of the sequence exists. As soon as the new image is recorded by the depth sensor camera and has been converted by means of image segmentation and projection into a list of 3D coordinates (3D point cloud) for the points of the surface of the object observed—e.g. the entire person, his torso, his hand etc.—, SOM training takes place in that an individual point of the point cloud is randomly selected and the topology element closest to this point is displaced in the direction of the selected point. The displacement takes place by vector addition in the 3D space, as a result of which individual node positions in the list of node positions mentioned above are changed or updated.

After this displacement, the next point of the 3D point cloud is randomly selected, and a topology element—most likely a different one—closest to the point now selected is displaced towards this point. Point selection and displacement are repeated for a predetermined number of steps, the general displacement distance being reduced with each step. The skeleton model is eventually updated for the new image after a sufficiently high predetermined number of steps.

Preferably at least 1,000 and at most 5,000 displacements of topology elements are carried out for fitting the skeleton model into a 3D point cloud. Particularly preferably the number of displacements is between 2,000 and 3,000. Several 1,000 displacements of node positions are achievable with today's computers within a few milliseconds.

According to this it is possible that the topology element closest to a selected point is no node. Edges or triangles are displaced by displacing all nodes that determine an edge or a triangle, in an inter-linked manner. The displacement can also simultaneously concern one, two or three nodes depending on the topology element to be displaced.

The determination of the closest topology element is explained in more detail below, and the specific displacement rules for the topology elements are named.

At first the crossing points of X in terms of all topology elements are at first determined for a point X of the 3D point cloud—that is to say for a coordinate point in the 3D space that, after imaging of the object observed using a depth sensor camera and subsequent image segmenting and projection, represents a point of the body surface of the person and is randomly selected from all these points. The crossing point P of X with reference to a topology element is that point of the sub space, formed by the topology element, of the 3D space that is closest to point X. In the process, nodes form zero-dimensional sub spaces that only contain the node itself. Edges form straight lines in the 3D space that run through the nodes defining the edge. Triangles form planes in the 3D space that contain the nodes defining the triangle.

The point closest to point X, of a sub space formed by a topology element is calculated using a distance measures. Distances in the 3D space can also be determined using any norms. Preferably the Euclidean norm (also $L_2$ norm or Pythagoras distance) is used, but other distance measures can also be used.

The crossing point P is situated in a node if the topology element is a node, and it coincides here with just this node.

The crossing point P is situated on a straight line in the 3D space, if the topology element is an edge.

$$P = W + \alpha \Delta W \quad (1)$$

Here W designates—any—first node of the edge, $\Delta W$ the differential vector between the second and the first node of the edge, and $\alpha$ a real number. To clarify: The edge is described by the node pair (W, W+$\Delta W$).

The crossing point P is situated on a plane in the 3D space if the topology element is a triangle. The point P can be represented as $$P = W + \sigma_1 \Delta W_1 + \sigma_2 \Delta W_2 \quad (2)$$

with W as—any—first node of the triangle, $\Delta W_1$, $\Delta W_2$ as differential vectors between the second and/or the third node and the first node of the triangle, and $\sigma_1$, $\sigma_2$ as real numbers. To clarify: The triangle is described by the node triplet (W, W+$\Delta W_1$, W+$\Delta W_2$).

The coefficients $\alpha$, $\sigma_1$, $\sigma_2$ from equations (1) and (2) shall be designated below as "topology-conforming representation coefficients" of a crossing point. Formally, these are the components of the vector P relative to a non-standardized and optionally an oblique-angled base of the sub space, formed by the topology element for which P is determined, of the 3D space. It is also possible to say that the crossing point P with reference to a topology element is represented as a linear combination of the node coordinate vectors determining the topology element.

It is then checked whether the crossing points of a point X with reference to the topology elements lie inside these topology elements.

By definition all crossing points with reference to nodes lie inside the nodes. Likewise by definition, the topology-conforming representation coefficient of a crossing point with reference to a node is always unity.

A crossing point with reference to an edge is inside the edge precisely if it is located between the nodes that define the edge. This means that a crossing point lies inside the edge if and only if its representation coefficient $\alpha$ is between 0 and 1.

A crossing point with reference to a triangle is inside the triangle precisely if it is inside the triangular surface that is defined by the nodes. For a crossing point with reference to a triangle, this is the case if and only if its representation coefficients $\sigma_1$, $\sigma_2$ and their sum $\sigma_1 + \sigma_2$ are between 0 and 1.

The distance of a point X of the 3D point cloud from a topology element can be calculated as a norm of the differential vector D between X and the crossing point P, i.e. in the following D:=X−P. Preferably the Euclidean norm is used. In this way, the distance $$d = \|D\|_2 = \|X - P\|_2 = \sqrt{(x_1 - p_1)^2 + (x_2 - p_2)^2 + (x_3 - p_3)^2} \quad (3)$$

with $x_1$, $x_2$, $x_3$, $p_1$, $p_2$, $p_3$ as real components of the vectors X and P with reference to the conventional 3D coordinate system, in which both the 3D point cloud and also the skeleton model are described, is calculated for each of the topology elements.

The distance of the point X from a topology element is further only used if the crossing point P with reference to this topology element is inside the topology element. If this is not the case, the crossing point is discarded, and either no distance is calculated or the calculated distance is subsequently ignored.

This selection ensures that during further processing only those distances are taken into account that actually serve the purpose of fitting the skeleton-model. The point X could for example be precisely in a plane in the 3D space that is formed by a triangle that represents the torso of the person. The crossing point P then coincides with X, and the distance d is zero. If, however, at the same time the point is situated in the vicinity of the position of the node that represents the right hand, and the right arm is held extended away from the body, the displacement rule is to be applied to the node and not to the triangle of the torso, even if the numeric distance of its plane from X is smaller than that of the node from X.

From all calculated distances—and those remaining in the evaluation—, by looking for the minimum, that topology element is identified that is closest to the point X, i.e. exhibits the smallest distance from X.

According to the invention, the identified topology element is now displaced, the nodes that define the topology element being possibly displaced jointly.

If the topology element closest to the point X is a node, then the displacement takes place according to $$W \xrightarrow{\text{update}} W + \varepsilon_t D \tag{4}$$

as is already known from the prior art. In WO 2010/130245 A1—equation (4) there—also the learning rate $$\varepsilon_t = \varepsilon_i \left(\frac{\varepsilon_f}{\varepsilon_i}\right)^{\frac{t}{t_{max}}} \tag{5}$$

that is a function of the iteration step is explained. Here $\varepsilon_i$ and $\varepsilon_f$ are predetermined starting and end values of the learning rate, and $t_{max}$ is the predetermined maximum number of learning steps. The running index t counts the learning steps (iterations) up to t max. For each newly selected point X of the 3D point cloud, the numerator t is increased by one until it reaches $t_{max}$. Preferred stipulations for the learning rate are $\varepsilon_i=0.5$ and $\varepsilon_f=0.01$.

If the topology element closest to point X is an edge, then the displacement takes place according to $$W \xrightarrow{\text{update}} W + \varepsilon_t(1-\alpha)D \tag{6}$$

$$W + \Delta W \xrightarrow{\text{update}} W + \Delta W + \varepsilon_t \alpha D \tag{7}$$

In FIG. 2 b), the edge (W, W+ΔW), a point X of the 3D point cloud, and its associated crossing point P with reference to the edge and the differential vector D=X−P are drawn. The topology-conforming representation coefficient α is to be regarded as that fraction of the edge length $\|\Delta W\|_2$ from which one has to walk in the direction ΔW, starting from the node W, to reach the point P. Obviously it is the case that in FIG. 2 b) 0<α<1, and the crossing point is thus inside the edge.

FIG. 2 c) outlines the displacement of the two nodes. Both are moved in the direction of the vector D=X−P, i.e. not—as in the prior art—directly towards X. If point X is closer to node W than to node W+ΔW, this then also applies for the crossing point P, and consequently α<0.5. The node W is then displaced further than the node W+ΔW. In this way, the entire edge approaches the point X weighted according to the distance of X and/or P from the nodes.

If the topology element closest to the point X is a triangle, then the displacement takes place according to $$W \xrightarrow{\text{update}} W + \varepsilon_t(1-\sigma_1-\sigma_2)D \tag{8}$$

$$W + \Delta W_1 \xrightarrow{\text{update}} W + \Delta W_1 + \varepsilon_t \sigma_1 D \tag{9}$$

$$W + \Delta W_2 \xrightarrow{\text{update}} W + \Delta W_2 + \varepsilon_t \sigma_2 D \tag{10}$$

Figure 3:
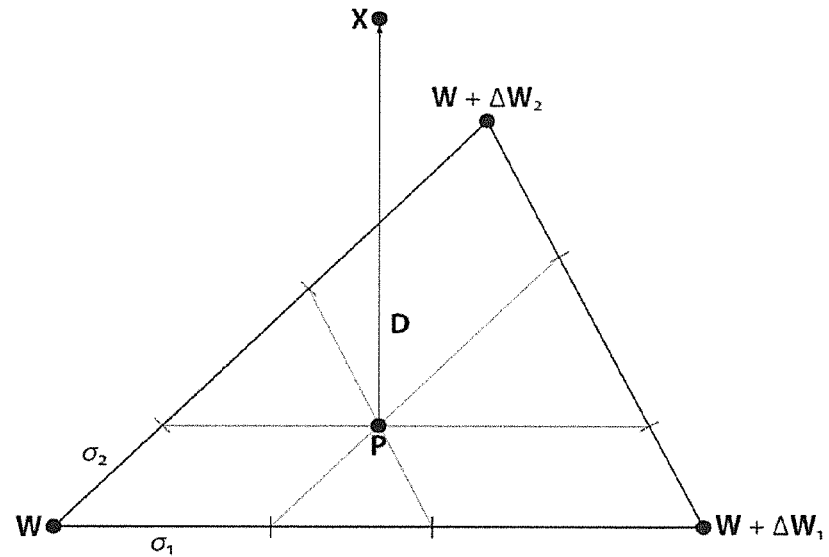
FIG. 3: shows a) a geometric interpretation of the weights of the learning rule and b) representation of the effect of the learning rule for the case of a triangle displacement.
Figure 3:
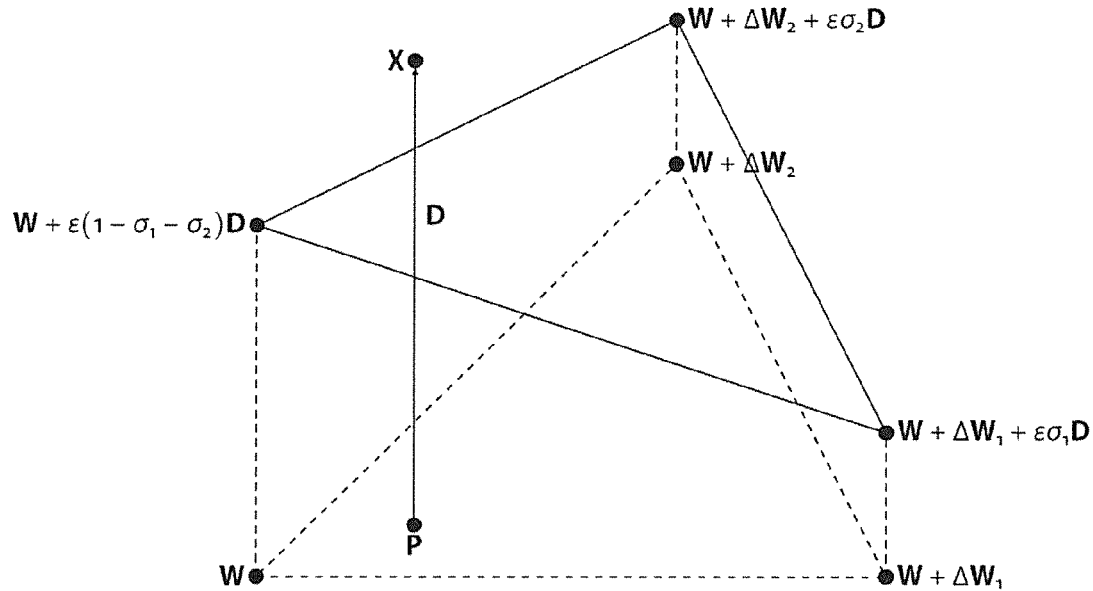

FIG. 3 illustrates the displacement rule for triangles.

FIG. 3 a) shows the starting triangle of the skeleton model and the randomly selected point X. The crossing point P associated with X is in the triangle plane and can be represented as a linear combination of the node coordinate vectors according to equation (2). For illustration purposes the representation coefficients $\sigma_1$, $\sigma_2$ are noted at the sides of the triangles. They are to be interpreted similarly to the coefficient α in FIG. 2 b) as fractions of the lengths of the triangle sides. The crossing point is inside the triangle, so that the distance of X from the triangle is determined as the norm of the vector D=X−P and used during the further calculation. If this distance turns out to be the smallest distance of X from all topology elements of the skeleton model, then the triangle is displaced.

The displaced triangle is outlined in FIG. 3 b). Here, too, all nodes—and together with these also all points on the sides of the triangle and in the surface of the triangle—are displaced, accordingly weighted with the original distance of the nodes from the points X and P. This weighting with the distance is important for the efficiency of pose estimation since unnecessary errors are avoided thereby. This advantage can be easily understood particularly when looking at FIG. 3 b): If the point P is very close to one of the three nodes that establish the triangle, the triangle is displaced such that almost only this closest node is moved while the two others essentially maintain their position. There is thus a "smooth transition" between node, edge, and triangle displacement in the method described here.

From FIG. 2 c) it can be easily recognized that an edge (W, W+ΔW) is in no way shortened by applying the learning rules (6) and (7), but quite possibly can be extended. The same holds for the sides a triangle (W, W+ΔW$_1$, W+ΔW$_2$) when applying the learning rules of equations (8) to (10).

So that no edge lengths and lengths of triangle sides that get out of hand are obtained during the course of training, a "shrinking parameter" δ is introduced in a further embodiment of the invention. It can for example be set as δ=0.05. At the same time, the learning rules are modified such that during displacement, the nodes are slightly moved towards each other.

Instead of rules (6) and (7) preferably $$W \xrightarrow{\text{update}} W + \delta \Delta W + \varepsilon_t(1-\alpha)D \tag{11}$$

$$W + \Delta W \xrightarrow{\text{update}} W + (1-\delta)\Delta W + \varepsilon_t \alpha D \tag{12}$$

are used, and instead of the equations of rules (8) to (10)

$$W \xrightarrow{update} W + \delta\Delta W_1 + \delta\Delta W_2 + \varepsilon_t(1 - \sigma_1 - \sigma_2)D \quad (13)$$

$$W + \Delta W_1 \xrightarrow{update} W + (1-\delta)\Delta W_1 + \delta(\Delta W_2 - \Delta W_1) + \varepsilon_t\sigma_1 D \quad (14)$$

$$W + \Delta W_2 \xrightarrow{update} W + (1-\delta)\Delta W_2 + \delta(\Delta W_1 - \Delta W_2) + \varepsilon_t\sigma_2 D \quad (15)$$

are used.

The method described can be used for estimating the human pose by calculating displacements of nodes of a skeleton model that is modelled according to human anatomy as in FIG. 1. However, it is also obvious that the same method can likewise be applied to movements of an animal or of a moving robot. The invention is to comprise the pose estimation of all objects that consist of parts that are interconnected and can move relative to each other and for which a skeleton model from nodes, edges, and optionally triangles can be conveniently defined.

The skeleton model is a table with 3D coordinates for the nodes of the topology and a list having predetermined node pairs and optionally node triplets for establishing edges and triangles. The list of node pairs and node triplets cannot be changed, only the node coordinates can change during the execution of the pose estimation. The table having node coordinates is available in an electronic memory and can be read out by an arithmetic unit. The arithmetic unit determines the displacements of the node positions relative to the continuous fitting of the skeleton model into the point clouds using a likewise stored image from the depth sensor camera and a 3D point cloud determined therefrom.

Fitting the anatomical model into the point cloud—consequently training the SOM—takes place according to an embodiment of the invention, summarized by:

a. randomly selecting a data point X of the 3D point cloud;
b. calculating the crossing point P relative to X with the reference to a topology element and determining its at least one topology-conforming representation coefficient;
c. discarding a crossing point if it does not lie inside the topology element;
d. calculating the distance from X to the topology element as a norm of the differential vector X–P;
e. repeating the steps b. to d. for all topology elements of the anatomical model;
f. determining that topology element that exhibits the minimum distance from X;
g. displacing the topology element determined under f. by displacing all nodes establishing the topology element in the direction of the vector X–P, the displacement vectors being multiplied by a learning rate and by weights that result from the topology-conforming representation coefficients of crossing point P relative to X with reference to the topology element determined under e., and
h. repeating the steps a. to g. for a predetermined number of learning steps while gradually reducing the learning rate.

The precise manner how the weights mentioned in step g result from the topology-conforming representation coefficients can be gathered from equations (6) to (10) or as an alternative (11) to (15), the latter ones comprising an additional, predetermined parameter δ. By definition, the weights for the displacement of topology elements that are nodes are unity according to equation (4).

If the predetermined number of learning steps has been reached, the arithmetic unit has calculated displaced coordinates for all nodes of the skeleton model. The displaced coordinates, as a rule, will deviate from the originally tabulated node coordinates for all nodes, but in exceptional cases can also be identical to these for individual nodes.

The displaced node coordinates are written into the electronic memory by the arithmetic unit, the original coordinate entries either i) being overwritten or ii) being designated as outdated and no longer used in further learning steps. In this way, the node coordinates are updated in the table of the electronic memory. Advantageously, it is possible to carry out the step of updating the node coordinates in the table of the electronic memory after only one pass of the predetermined number of learning steps and then to use the subsequent image of the image sequence from the depth sensor camera and the point cloud determined therefrom to start the next pass of the steps a to h.

Likewise it is also possible to cycle through the learning steps for one and the same point cloud several times one after the other to calculate a plurality of displacements of node coordinates. This plurality of displacements can then be averaged for example arithmetically, and the node coordinates are updated in the table of the electronic memory only together with the averaged displacement. This procedure is more complicated in terms of computation and thus slower but can also effectively suppress any accidentally occurring unfavourable displacements (e.g. if the point cloud also comprises points with an outsider position that are selected at random).

Broadly speaking, updating the node coordinates therefore takes place after K passes of the predetermined number of learning steps, $K \geq 1$.

Figure 4:
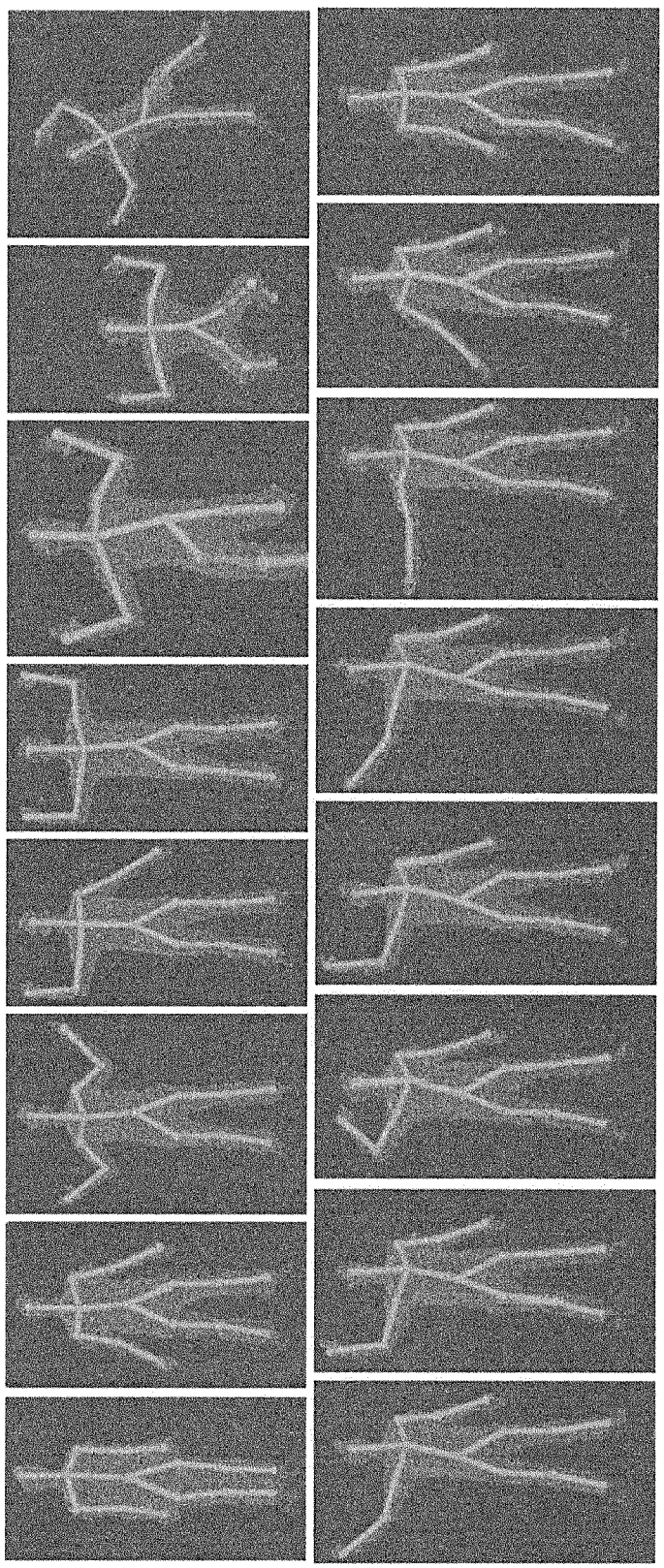
FIG. 4: shows exemplary images having 3D point clouds and skeleton models fitted into these point clouds according to the invention.

An exemplary embodiment for the inventive pose estimation method with the skeleton model from FIG. 1 b) is presented in FIG. 4 using exemplary images from video sequences. The video images of a depth sensor camera constantly provide 3D point clouds that represent a moving person, using image segmentation that is known per se. The anatomic skeleton model is fitted in real time using the learning rules described above, and the association of the model nodes with the different body parts of the person remains correct throughout as can be clearly gathered from FIG. 4.

The robust association node—body part that is now achieved permits a markedly more stable command input by means of gesture control, for example simply by tracking the movements of the right hand. A machine that interprets the skeleton-node positions can ignore, as is necessary, the remaining model nodes or also classify them as additional inputs. Thus it is for example possible to carry out more complex inputs by simultaneously and separately tracking and interpreting the movements of the right hand and of the left hand. Lifting the left hand to the level of a head can for example be equivalent to pressing a certain key (e.g. shift key) on a keyboard or retrieve another set of command interpretations for the inputs of the right hand.

In addition to fast detection and provision of 2½ images by means of a depth sensor camera, the method described also requires an electronic memory at least for temporarily storing the measurement data and for storing position coordinates of the topology elements of the anatomic skeleton model and also an electronic arithmetic unit communicating with the memory that carries out the calculations described and in particular prompts the continuous update of the position coordinates of the topology elements in the memory. Furthermore, the same arithmetic unit can either on its own interpret the respective current skeleton model keeping in step temporally and for example translate it into control commands for subordinate apparatuses, or possibly only output selected node positions for further interpretation.

As was described at the beginning, the method described for pose estimation can be carried out by an apparatus, in particular an arithmetic unit. The arithmetic unit can be a commercially available programmable microprocessor, but it is also possible to use FPGAs or ASICs. A further embodiment of the invention relates to a storage medium that stores commands that can be carried out by an arithmetic unit and that cause the arithmetic unit to carry out the calculations described here for the purpose of pose estimation.

A depth sensor camera that comprises an arithmetic unit for determining the distance coordinate can in particular also be engineered directly to carry out the inventive method. Such a camera as a constructional unit having at least one arithmetic unit designed according to the invention is correspondingly suited to directly translate the image of a moving person into 3D coordinates of his essential body parts. This is comparable to a motion capture apparatus where, however, the markers on the body of the person that until now were common, can be dispensed with.

The invention claimed is:

1. A method for pose estimation of a moving object by computer calculation of displacements of the 3D position coordinates of the nodes of a skeleton model, that is continuously fitted into a sequence of 3D point clouds, the node coordinates being present in table form in an electronic memory and the 3D point clouds being determined from electronically recorded images of a depth sensor camera that represent the moving object,
   the skeleton model being a topology that exhibits as topology elements $N_1$ nodes, $N_2$ edges, and $N_3$ triangles having $N_1$, $N_2 > 0$ and $N_3 \geq 0$, and each topology element being described by nodes, node pairs, or node triplets and being firmly assigned to a part of the moving object, and that an arithmetic unit carries out the following steps:
   a. randomly selecting a data point X of the 3D point cloud;
   b. calculating the crossing point P relative to X with reference to each topology element and identifying whether P lies in each case inside the topology element;
   c. calculating the distance from X to each topology element as the norm of the differential vector X-P;
   d. determining that topology element that exhibits the minimum distance from X among all topology elements whose crossing point P lies inside the topology element;
   e. displacing the topology element determined in step d by displacing all nodes establishing the topology element in the direction of the vector X-P, the displacement vector for a node being multiplied by a learning rate and by a weight that results from the crossing point P relative to X with reference to the topology element determined in step d, and
   f. repeating the steps a to e for a predetermined number of learning steps while gradually reducing the learning rate;
   g. updating the node coordinates in the table of the electronic memory after K passes of the predetermined number of learning steps with $K \geq 1$;
   h. providing at least the node coordinates updated in the table for further processing.

2. The method according to claim 1, wherein in step b the crossing point P with reference to a topology element is represented as a linear combination of the node coordinate vectors establishing the topology element and it is determined from the representation coefficients whether P lies inside the topology element.

3. The method according to claim 1, wherein the weight in step e is calculated from the representation coefficients of P.

4. The method according to claim 1, the number of repetitions of the steps a to e being between 1,000 and 5,000, in particular between 2,000 and 3,000.

5. The method according to claim 1, to the learning rate being between the starting value 0.5 and the end value 0.01.

6. The method according to claim 1, further comprising generating control commands for an apparatus to be controlled on the basis of information from the table of the updated node coordinates and of controlling the apparatus to be controlled by means of the control commands.

7. An apparatus for pose estimation of a moving object, comprising:
   a depth sensor camera configured to detect electronic images of the moving object,
   an electronic memory configured to store the electronic images of the depth sensor camera, and
   an arithmetic unit that is designed to determine a 3D point cloud representing the object from the electronic images temporally in step with the image recording by the camera, and
   wherein the memory further stores a list of 3D coordinates for the nodes of a skeleton model and the arithmetic unit being able to read out and change these coordinates for individual nodes, predetermined node pairs, and predetermined node triplets as representation of the topology elements of the skeleton model,
   wherein the arithmetic unit is further designed, after determining the 3D point cloud representing the object, to carry out the following steps:
   a. randomly selecting a data point X of the 3D point cloud;
   b. calculating the crossing point P relative to X with reference to each topology element and identifying whether P lies in each case inside the topology element;
   c. calculating the distance from X to each topology element as the norm of the differential vector X-P;
   d. determining that topology element that exhibits the minimum distance from X among all topology elements where the crossing point P lies within the topology element;
   e. displacing the topology element determined in step d by displacing all nodes establishing the topology element in the direction of the vector X-P, the displacement vector for a node being multiplied by a learning rate and by a weight that results from the crossing point P relative to X with reference to the topology element determined in step d, and
   f. repeating the steps a to e for a predetermined number of learning steps while gradually reducing the learning rate;
   g. updating the node coordinates in the table of the electronic memory after K passes of the predetermined number of learning steps with $K \geq 1$;
   h. providing at least the node coordinates updated in the table for further processing.

8. A non-transitory computer-readable storage medium that stores commands that, once executed by an arithmetic unit, cause the arithmetic unit to carry out 6 pose estimation of a moving object by computer calculation of displacements of the 3D position coordinates of the nodes of a skeleton model, that is continuously fitted into a sequence of 3D point clouds, the node coordinates being present in table form in an electronic memory and the 3D point clouds being determined from electronically recorded images of a depth sensor camera that represent the moving object, the skeleton model being a topology that exhibits as topology elements $N_1$ nodes, $N_2$ edges, and $N_3$ triangles having $N_1$, $N_2 > 0$ and $N_3 \geq 0$, and each topology element being described by nodes, node pairs, or node triplets and being firmly assigned to a part of the moving object, wherein the execution of said instructions cause the arithmetic unit to perform the following:

a. randomly selecting a data point X of the 3D point cloud;
b. calculating the crossing point P relative to X with reference to each topology element and identifying whether P lies in each case inside the topology element;
c. calculating the distance from X to each topology element as the norm of the differential vector X-P;
d. determining that topology element that exhibits the minimum distance from X among all topology elements whose crossing point P lies inside the topology element;
e. displacing the topology element determined in step d by displacing all nodes establishing the topology element in the direction of the vector X-P, the displacement vector for a node being multiplied by a learning rate and by a weight that results from the crossing point P relative to X with reference to the topology element determined in step d, and
f. repeating the steps a to e for a predetermined number of learning steps while gradually reducing the learning rate;
g. updating the node coordinates in the table of the electronic memory after K passes of the predetermined number of learning steps with $K \geq 1$;
h. providing at least the node coordinates updated in the table for further processing.

* * * * *